United States Patent
Smith, Jr.

[15] 3,699,433
[45] Oct. 17, 1972

[54] SHORT CIRCUIT LOCATOR APPARATUS INCLUDING A PLURALITY OF INTERMITTENTLY OPERATED CIRCUIT BREAKERS

[72] Inventor: Raymond Peter Smith, Jr., P.O. Box 294, South Williamsport, Pa. 17701

[22] Filed: Nov. 24, 1970

[21] Appl. No.: 92,388

[52] U.S. Cl. .................. 324/52, 340/250, 340/253 A
[51] Int. Cl. ............................................. G01r 31/08
[58] Field of Search ..324/51, 52, 115; 340/250, 255, 340/253 A, 256; 337/79

[56] References Cited

UNITED STATES PATENTS

| | | | |
|---|---|---|---|
| 3,158,713 | 11/1964 | Margulies | 340/250 |
| 3,074,013 | 1/1963 | Bowden | 340/255 X |
| 1,262,103 | 4/1918 | Schweitzer | 324/51 |
| 2,976,484 | 3/1961 | McClain | 340/250 X |
| 3,356,939 | 12/1967 | Stevenson | 324/51 |
| 3,263,164 | 7/1966 | Solgere | 324/51 |
| 2,789,236 | 4/1957 | Cummings | 324/51 X |
| 3,514,694 | 5/1970 | Beachley | 324/51 |
| 2,581,308 | 1/1952 | Smith | 340/250 X |
| 2,039,267 | 4/1936 | Barber | 324/115 X |
| 2,716,216 | 8/1955 | Schwenzfeier | 324/52 X |
| 3,204,923 | 9/1965 | Rynders et al. | 337/79 X |
| 3,530,337 | 9/1970 | Moore | 340/253 A X |
| 3,621,384 | 11/1971 | Yamada | 324/52 |

FOREIGN PATENTS OR APPLICATIONS

| | | | |
|---|---|---|---|
| 767,558 | 2/1957 | Great Britain | 324/52 |
| 234,592 | 6/1925 | Great Britain | 340/253 A |

*Primary Examiner*—Gerard R. Strecker
*Attorney*—Sughrue, Rothwell, Mion, Zinn & Macpeak

[57] ABSTRACT

A method and apparatus for locating short circuits, primarily in a vehicle, which comprises of placing a pair of test leads across the defective fuse in a shorted circuit, the test leads being connected to a plurality of circuit breakers through a selector switch for selecting one of the circuit breakers. A relay in parallel with the selected circuit breaker operates a switch which controls a light and tone generator, such that when the circuit breaker is placed across the fuse terminals of a shorted circuit, an audible and visual signal will be generated by the tone generator and light.

6 Claims, 2 Drawing Figures

PATENTED OCT 17 1972

3,699,433

INVENTOR
RAYMOND PETER SMITH, JR.

BY Sughrue, Rothwell, Mion,
Zinn & Macpeak
ATTORNEYS

SHORT CIRCUIT LOCATOR APPARATUS INCLUDING A PLURALITY OF INTERMITTENTLY OPERATED CIRCUIT BREAKERS

BACKGROUND OF THE INVENTION

1. Field of the Invention

This invention relates to a method and apparatus for the location of short circuits and more particularly to placing an apparatus with a plurality of circuit breakers across the fuse terminals of a shorted circuit such that an audible and visual signal are generated so long as the short circuit exists.

2. Description of the Prior Art

In prior art devices a plug was inserted in place of a defective fuse in a shorted circuit and an audible or visual indication was given until the short circuit was fixed. In this arrangement a large current due to the short circuit could burn out the circuit wiring as well as the audible and visual indicators. Furthermore, the operator of the device had no indication as to the character of the short circuit.

SUMMARY OF THE INVENTION

When a short circuit occurs in an automotive electrical circuit the fuse in that circuit usually burns out. In the method and apparatus of this invention two test leads are placed across the terminals of the defective fuse. One of the test leads is connected to a bus bar and the other is connected to a rotary switch for selecting one of a plurality of thermal type circuit breakers. One side of the circuit breakers is connected to the rotary switch and the other side is connected to the bus bar. A relay is connected in parallel with the series circuit of the selector switch and selected circuit breaker in such a manner that when the thermal type circuit breaker opens due to the short circuited current through it, the relay will operate to close a switch. The relay operated switch is connected to audible and visual indicators, such that upon operation of the switch the indicators give their respective indications. The short circuit may be located by placing the test leads across the defective fuse terminals of the shorted circuit and selecting an appropriate thermal type circuit breaker. The breaker is selected in accordance with the rated value of the defective fuse or the wire gauge in the shorted circuit. This will cause an audible and visual signal to be given by the indicator devices. The short is then located by the operator physically moving along the circuit separating the wires or by moving along the wire with a probeless ammeter. With the ammeter the point of highest current is the location of the short. When the short circuit is located and fixed the audible and visual indication will cease, because there will no longer be sufficient current through the thermal type circuit breaker to open that breaker, thereby energizing the relay which causes the operation of the audible and visual indicators.

An ammeter is provided which may be connected into said shorted circuit so the operator will be given some indication as to the nature of the short circuit. For example, if the short is made by a large area of bare wire touching the chassis of an automobile and making a good connection with the chassis, then a large short circuit current will be drawn through the ammeter. If, on the other hand, the short is caused by a small amount of wire barely touching the chassis of an automobile, then the connection will be a poor one and a small short circuit current will be drawn through the ammeter. By noting the current drawn the operator can determine the nature of the short circuit.

It is therefore the primary object of the invention to provide a method and apparatus for the location of short circuits.

It is another object of this invention to provide a method and apparatus for the location of short circuits in which the indicators of the apparatus are provided with over-current protection.

It is also an object of this invention to provide a method and apparatus for the location of short circuits in which the operator may determine the nature of the short circuit which he is trying to locate.

DESCRIPTION OF THE PREFERRED EMBODIMENT

Figure 1:
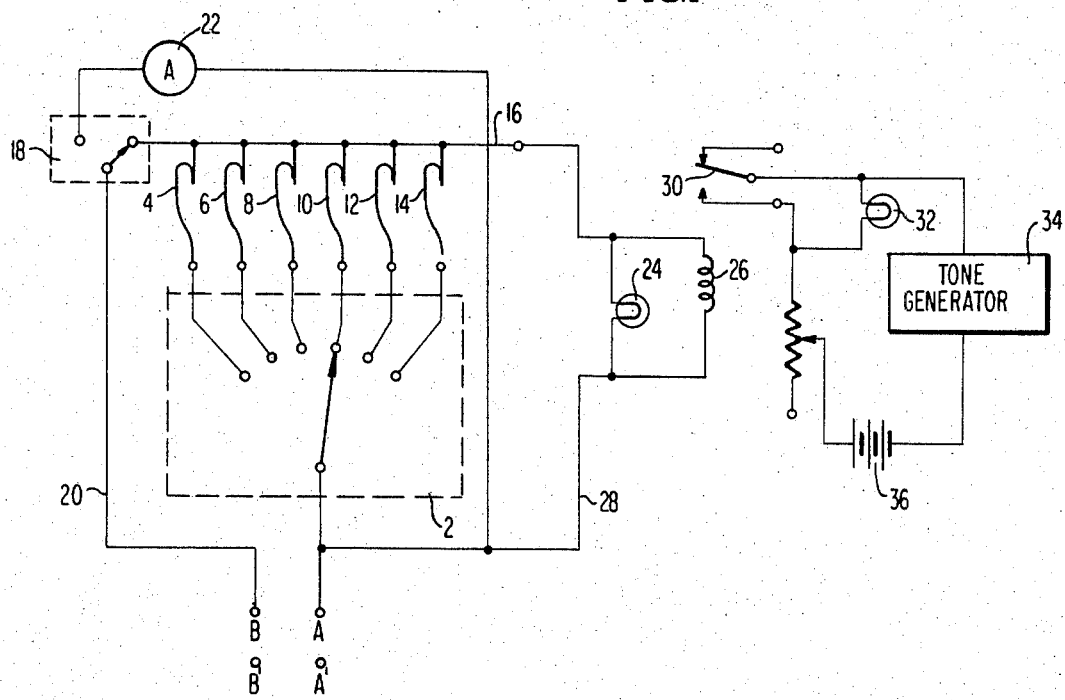
FIG. 1 shows a circuit diagram of the preferred embodiment of the present invention.

Referring to FIG. 1, test lead A is connected to selector switch 2 which is used to select one of the thermal type circuit breakers 4 – 14. The circuit breakers are all connected to bus bar 16. Test lead B is connected to the fuse terminal B'. Selector switch 18 is connected to test lead B through line 20. Selector switch 18 is used to select between ammeter 22 and circuit breakers 4 – 14 when testing a shorted circuit. Lamp 24 and relay coil 26 are connected between bus bar 16 and test lead A.

When test leads A and B are connected to fuse terminals A' and B' and selector switch 18 is set so that an appropriate one of the thermal type circuit breakers 4 – are placed in the circuit, current flows from one terminal of the vehicle battery through the short circuit through selector switch 18, bus bar 16, to the selected circuit breaker 10 as shown in FIG. 1. Current flows through the circuit breaker through selector switch 2 and then to the other terminal of the vehicle battery which is connected to terminal A through the shorted circuit. When circuit breaker 10 has heated up, it will open, thereby causing sufficient current to flow through relay 26 to operate that relay. Since the circuit breaker 10 is then open, no current will flow through it and it will cool down, reclosing the circuit through selector switch 2 and thereby cutting off current through relay 26. This, therefore, produces an intermittent current through relay 26.

When current flows through relay 26 it operates switch 30, thereby causing current to flow through lamp 32 and tone generator 34. Power is supplied to lamp 32 and tone generator 34 from power supply 36 which is separate from the vehicle power supply. As can readily be seen therefore, the intermittent current through relay 26 intermittently operates switch 30, causing lamp 32 to give a flashing indication for the existence of a short circuit and further causing tone generator 34 to give an intermittent audible indication for the short circuit. When selector switch 18 is in a position to connect ammeter 22 across test leads A and B, the operator of this invention will be given an indication of the current flowing in the short circuit and this will aid him in determining the nature of the short circuit.

Figure 2:
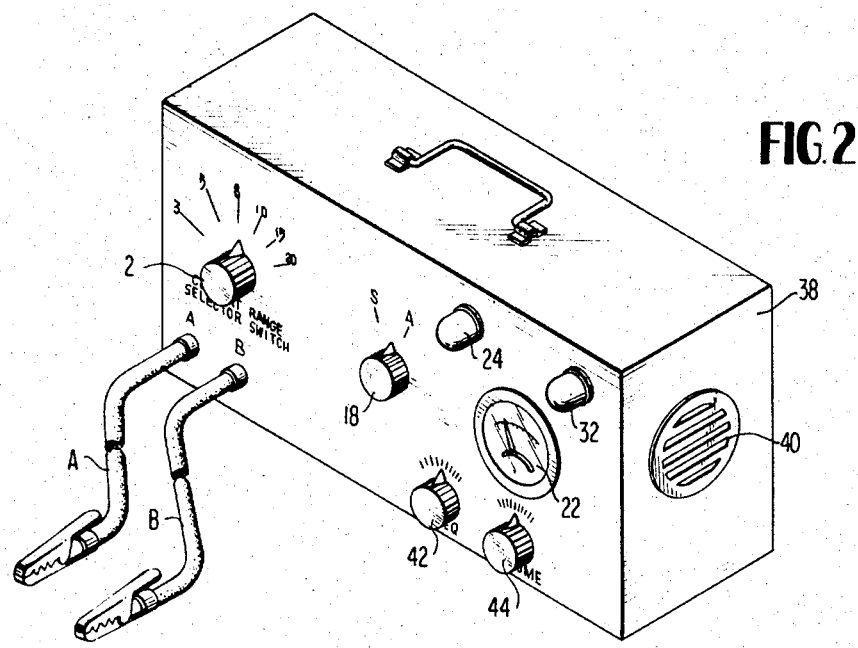
FIG. 2 shows the exterior of the preferred embodiment of this invention.

Referring now to FIG. 2, the apparatus of this invention is housed in case 38. On the front face of case 38 are selector switches 2 and 18, ammeter 22, and indicator lamps 24 and 32. Extending from case 38 are test leads A and B. On the side of case 38 is an opening 40 for emitting sounds from tone generator 34. The apparatus further includes selector switches 42 and 44 for selecting the frequency and volume of tone generator 34.

When operating this device, selector switch 2 is set at a value corresponding to the rated value of the defective fuse or to the gauge of the wire in the shorted circuit. The operator then places test lead A onto one terminal of the fuse terminals of the shorted circuit and test lead B on the other fuse terminal. Selector switch 18 is placed in the position for operating ammeter 22 and the operator checks the reading of the ammeter to determine the current flowing in the shorted circuit. This gives him an indication of the nature of the short circuit. If there is a large current this is indicative of the fact that there is a large short in the circuit. This might, for example, be a bare wire tightly pressed against the chassis of the automobile. On the other hand, if there is a low current this is indicative of the fact that the short is small, such as a slightly bared wire lightly pressing against the chassis of the automobile. Since the operator knows the nature of the short for which he is looking, his task in finding the short will be greatly simplified. After determining the amount of current in the shorted circuit, switch 18 is then moved to the circuit breaker position, at which time lamp 32 begins flashing and an audible signal is emitted from opening 40. The operator then physically begins moving the wires of the shorted circuit away from the chassis of the automobile. When the short circuit is reached and is separated from the chassis of the automobile the short will be opened and a lamp 32 will stop flashing and tone generator 34 will stop emitting an audible tone. As previously stated, the operator will be able to tell the nature of the short for which he is looking by noting the current through ammeter 22.

While the invention has been particularly shown and described with reference to the further embodiment thereof, it will be understood by those skilled in the art that various changes in form and detail may be made therein without departing from the spirit and scope of the invention.

What is claimed is:

1. An apparatus for locating shorts in an electrical circuit including a protective means comprising:
   a. first and second test lead means for connecting said apparatus across said protective means;
   b. a plurality of intermittently operating circuit breakers, each circuit breaker connected to said first test lead means and opening and closing in response to a different magnitude of current therethrough;
   c. selector switch means connected between said second test lead means and said plurality of circuit breakers for selecting one circuit breaker from said plurality;
   d. switch means connected between said first and second test lead means and in parallel with said selected circuit breaker for conducting the current between said test lead means when said one circuit breaker opens, with the resistance of said switch means being high relative to the resistance of said selected circuit breaker; and
   e. indicator means connected to said switch means for operating in response to the operation of said switch means.

2. The apparatus of claim 1 wherein each circuit breaker is a thermal type whereby when the current exceeds the rated value of said circuit breaker said circuit breaker opens and after cooling closes in a cyclic action, thereby causing an intermittent current to flow through said switch means.

3. The apparatus of claim 2 wherein said switch means comprises a relay.

4. The apparatus of claim 1 wherein said indicator means comprises both an audible and visual indicator.

5. The apparatus of claim 1 further including ammeter means connected across said first and second test leads means for indicating the magnitude of the current flowing in the shorted circuit.

6. The apparatus of claim 3 wherein said indicator means comprises an audible and visual indicator; and further including ammeter means connected across said first and second test lead means for indicating the magnitude of the current flowing in the shorted circuit.

* * * * *